United States Patent
Crumlin et al.

(10) Patent No.: US 9,554,560 B2
(45) Date of Patent: Jan. 31, 2017

(54) SYSTEM AND METHOD FOR VARIABLE ANIMAL INTERACTION DEVICE

(71) Applicants: Ethan Jon Crumlin, Berkeley, CA (US); Amy Lai Wong, San Francisco, CA (US)

(72) Inventors: Ethan Jon Crumlin, Berkeley, CA (US); Amy Lai Wong, San Francisco, CA (US)

( * ) Notice: Subject to any disclaimer, the term of this patent is extended or adjusted under 35 U.S.C. 154(b) by 0 days.

(21) Appl. No.: 14/228,222

(22) Filed: Mar. 27, 2014

(65) Prior Publication Data

US 2014/0290582 A1    Oct. 2, 2014

Related U.S. Application Data

(60) Provisional application No. 61/853,045, filed on Mar. 27, 2013.

(51) Int. Cl.
*A01K 29/00* (2006.01)
*A01K 15/02* (2006.01)

(52) U.S. Cl.
CPC .................................. *A01K 15/025* (2013.01)

(58) Field of Classification Search
CPC .................................................... A01K 15/025
USPC ................................................. 119/707–711
See application file for complete search history.

(56) References Cited

U.S. PATENT DOCUMENTS

| | | | |
|---|---|---|---|
| 5,376,038 A * | 12/1994 | Arad et al. | 446/297 |
| 5,471,192 A * | 11/1995 | Dash | 340/384.3 |
| 6,890,239 B2 * | 5/2005 | Kopelle | 446/320 |
| 7,328,671 B2 | 2/2008 | Kates | |
| 7,958,877 B2 | 6/2011 | Lalor | |
| 8,863,697 B2 * | 10/2014 | del Pinal et al. | 119/709 |
| 2002/0132554 A1 * | 9/2002 | Brown | 446/297 |
| 2004/0077280 A1 * | 4/2004 | Kopelle | 446/398 |
| 2005/0284412 A1 * | 12/2005 | Kroll | 119/719 |
| 2008/0194175 A1 * | 8/2008 | Last et al. | 446/302 |
| 2009/0156089 A1 * | 6/2009 | Hoard et al. | 446/297 |
| 2009/0280717 A1 * | 11/2009 | Chan | 446/175 |
| 2010/0199924 A1 * | 8/2010 | del Pinal et al. | 119/707 |
| 2011/0065355 A1 * | 3/2011 | Chu | 446/369 |
| 2011/0080459 A1 | 4/2011 | Kroll | |
| 2011/0117810 A1 * | 5/2011 | Morley et al. | 446/369 |
| 2011/0221758 A1 * | 9/2011 | Livingston | 345/581 |
| 2011/0308477 A1 * | 12/2011 | Durrani | 119/709 |
| 2012/0097113 A1 * | 4/2012 | McKinney | 119/707 |
| 2012/0115392 A1 * | 5/2012 | Chu | 446/369 |
| 2012/0240863 A1 | 9/2012 | Araujo | |
| 2013/0078886 A1 * | 3/2013 | Wisniewski | 446/297 |
| 2014/0256213 A1 * | 9/2014 | Copeland et al. | 446/268 |

(Continued)

*Primary Examiner* — Kristen C Hayes
(74) *Attorney, Agent, or Firm* — Amy L. Wong

(57) ABSTRACT

Disclosed is a system for a variable animal interaction device including an animal interaction device; a shell at least partially embedded into the animal interaction device; a component that is substantially encapsulated within the shell, wherein the shell is a barrier between the animal and the component; a detection device that detects a change in the shell; a deterrent device that has at least an on and an off state wherein the on state substantially changes the animal interaction device to substantially deter further interaction between the animal and the animal interaction device; wherein the deterrent device is actuated into the on state when the detection device detects a change in the shell.

23 Claims, 4 Drawing Sheets

(56) References Cited

U.S. PATENT DOCUMENTS

2014/0329433 A1\* 11/2014 Carrero ..................... 446/297
2015/0133025 A1\* 5/2015 Ponomarev et al. ......... 446/484

\* cited by examiner

SYSTEM AND METHOD FOR VARIABLE ANIMAL INTERACTION DEVICE

CROSS-REFERENCE TO RELATED APPLICATIONS

This application claims the benefit of U.S. Provisional Application No. 61/853,045, filed 27 Mar. 2013, which is incorporated in its entirety by this reference.

TECHNICAL FIELD

This invention relates generally to the field of interaction devices, and more specifically to a new and useful system and method for a variable state device in the field of animal interaction devices.

BACKGROUND

Pet ownership is relatively common among the human population in a variety of cultures all across the globe. The companionship of a pet has been linked with improving mental health in humans, for example, as described in "Friends with Benefits: On the Positive Consequences of Pet Ownership," Allen R. McConnel, PhD, Miami University; Christina M. Brown, PhD, Saint Louis University; Tonya M. Shoda, M A, Laura E. Stayton, B A and Colleen E. Martin, B A, Miami University; *Journal of Personality and Social Psychology*, 2011 Vol. 101, No. 6. In a common household, however, a pet may be left alone at home for extended hours during the day while the owner(s) is at work or performing activities where the pet cannot accompany the owner. This prolonged separation may lead to the pet becoming under stimulated and/or under exercised. This has lead to the development of more complex pet interaction devices that help exercise and/or stimulate the pet. Such devices may also be remotely controlled by the pet owner from a remote location to provide exercise and/or stimulation to the pet when the owner is not present. These more complex interaction devices may contain electronics and other components that are not generally safe for a pet. If the pet caretaker is present and supervising the pet interaction with the interaction device, the pet caretaker may be able to remove the interaction device from the reach of the pet as soon as exposure to these components is detected. However, this is not possible if the pet caretaker is located at a remote location. Because safety is a major concern for pet owners, there is a need in the field of animal interaction devices to create a new and useful system and method for a variable state animal interaction device.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1:
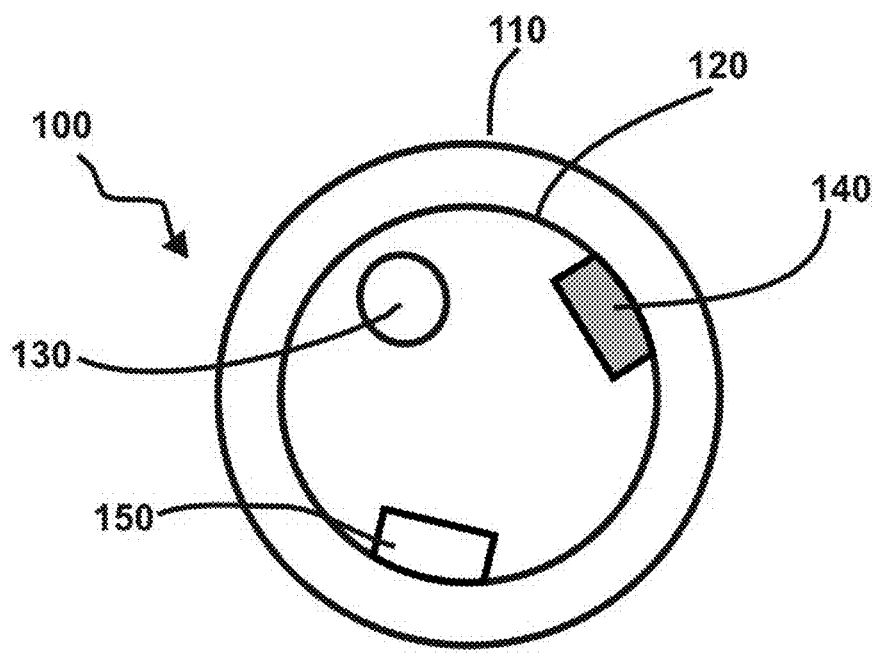
FIG. 1 is a schematic view of the system for a variable animal interaction device of the preferred embodiments.

As shown in FIG. 1, the system 100 of the preferred embodiments includes an animal interaction device 110; a shell 120 coupled to the animal interaction device 110; a component 130 that is substantially encapsulated within the shell, wherein the shell functions as a barrier between the animal and the component; a detection device 140 that detects a change in the shell; and a deterrent device 150 that actuates into an on state when the detection device 140 detects a change in the shell. The system 100 of the preferred embodiments may also include a second shell substantially contained within the shell 120 that functions as a second barrier between the animal and the component 130. The system 100 of the preferred embodiments functions as a safety mechanism that functions to deter the animal from coming into contact with the component 130 that is contained inside the shell 120. The component 130 may include electrical components such as capacitors, resistors, mosfets, power regulators, batteries, motors, wires, printed circuit boards, and/or any other type of electrical component. The component 130 may also include mechanical components such as springs, gears, mechanisms, linkages, screws, sharp objects, and/or any other type of mechanical component. The component 130 may also include chemical components. However, the component 130 may alternatively be any other type of component that is to be kept away from contact with the animal. When a change in the shell 120 is detected by the detection device 140, deterrent device 150 will deploy a deterrent that is designed to discourage further interaction between the animal and the interaction device 110.

The animal interaction device 110 may be a variety of interaction type devices. In a first variation, the animal interaction device 110 may be a more traditional type of pet toy that has enhanced features. For example, the animal interaction device 110 may be a ball as shown in FIGS. 1-4 with a plurality of components 130 such as a battery and a motor that functions to cause the ball to roll, vibrate, and/or any other suitable type of motion. The components 130 may also include wireless communicators that allow for remote control of the ball and/or a sound-emitting device. The animal interaction device may alternatively be any other type of toy, for example, a plush toy or a wheeled toy as shown in FIG. 5 where the components 130 function to cause the toy to jump or drive from one location to another and enticing the animal to chase after it. In a second variation, the animal interaction device 110 may be a visual stimulation device and may include components 130 that include a video output device. In this variation, the animal interaction device 110 may output video images to the animal and/or allow a pet owner in a remote location to send video images of him/herself to the animal. The components 130 may also include a sound emitting component and/or a microphone that allow the animal interaction device 110 to output sound and receive sound to and from the animal. In a third variation, the animal interaction device 110 may be a food and/or water-dispensing device where the components 130 include actuators that dispense the food and/or water. In a fourth variation, the animal interaction device 110 may be a fetch device that launches toys for the animal to catch and/or fetch. However, any other suitable types of animal interaction device 110 and components 130 may be used.

Figure 2:
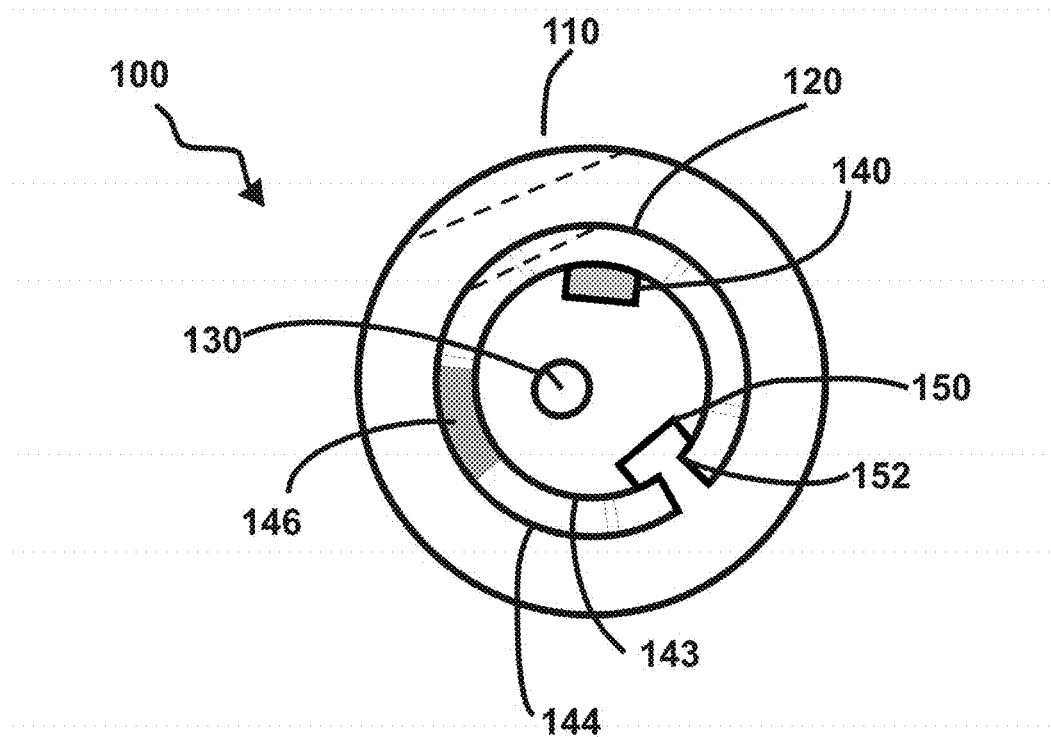
FIG. 2 is a schematic view of the system for a variable animal interaction device with a detection device of a first variation.
Figure 5:
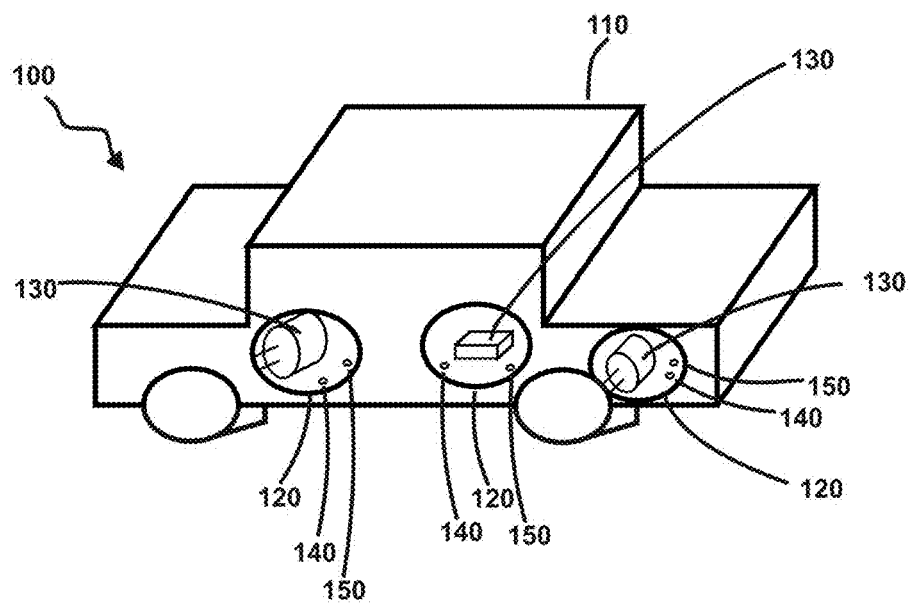
FIG. 5 is a schematic view of the system for a variable animal interaction device that includes a plurality of shells.
Figure 6:
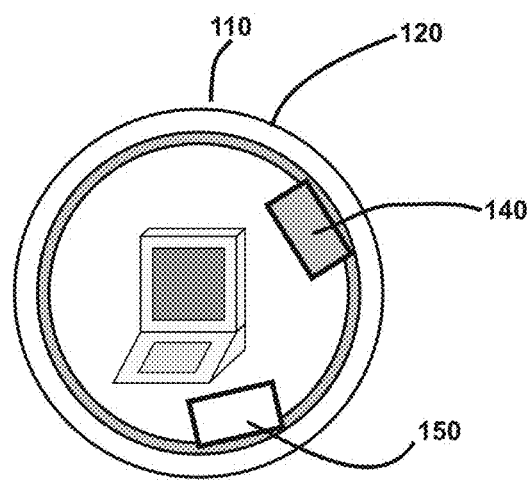
FIG. 6 is a schematic view of the system for a variable animal interaction device where the shell substantially encapsulates the entire animal interaction device.
Figure 7:
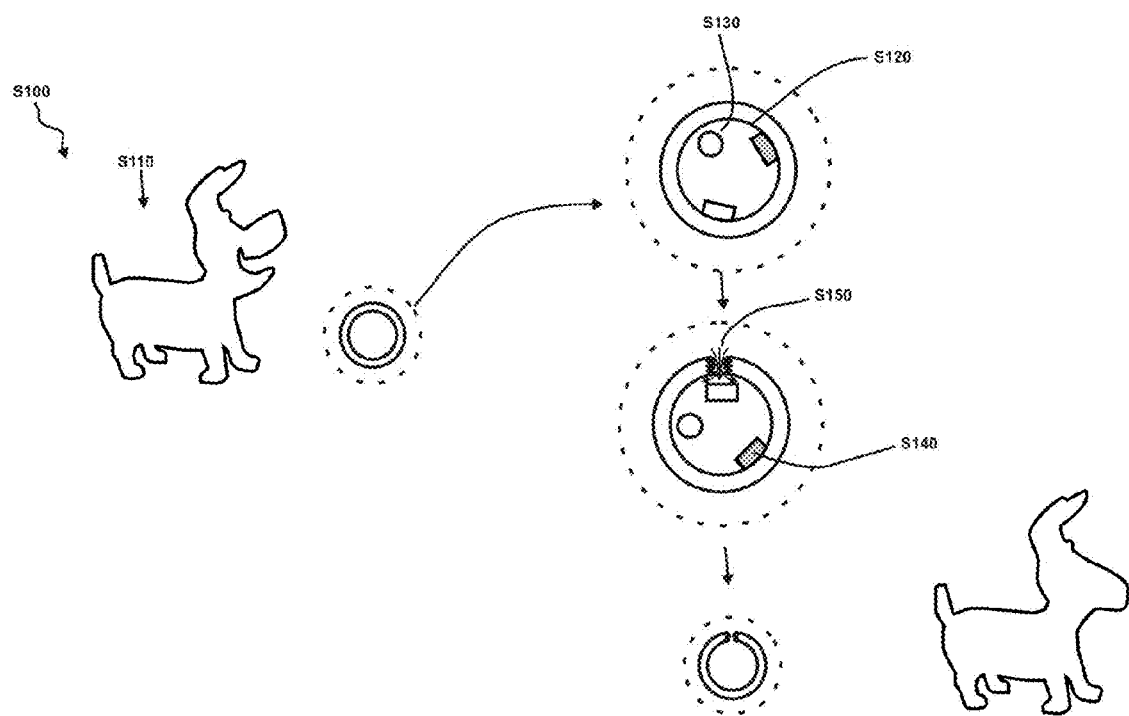
FIG. 7 is a schematic view of the method of responding to interaction with an animal of the preferred embodiments.

The shell 120 of the preferred embodiment is preferably coupled to the animal interaction device 110 and functions to contain at least a portion of the components necessary to allow the animal interaction device 110 to stimulate and/or exercise the animal. As shown in FIG. 5, the animal interaction device 110 may include a plurality of shells 120 that enclose portions of the components 130 in the animal interaction device 110. The shell 120 is preferably at least partially embedded into the animal interaction device 110 as shown in FIGS. 1-5. This allows the animal to have direct contact with the surface of the animal interaction device 110. However, as shown in FIGS. 2 and 6, the shell 120 may function to enclose the entire device. In the example shown in FIG. 6, the animal interaction device 110 includes a video output device component that is to be visible to the animal. In order to protect the video output device from direct contact with the animal, the shell 120 is placed around the entire device 110 and is preferably transparent. In this variation, the shell 120 also functions as the outer surface of the animal interaction device 110.

The shell 120 preferably includes an outer surface that is substantially safe for animal contact and is preferably a tough material that is resistant to tear, cracking, shattering, and/or any other type of breakage when subjected to high force, abrasion, heat, and/or wear. The material is also preferably elastic to absorb forces that maybe applied to the shell 120. The shell 120 is preferably of a rubber material such as those seen in tennis balls or any other type of thermoset material that is can be formed into a desired shape. However, any other type of material may be used for the shell 120 such as thermoplastics or metals. The shell 120 may be formed with the component 130 inside. For example, the shell 120 may be overmolded or spin molded/casted over the component 130. Alternatively the shell 120 may be assembled to substantially encapsulate the component 130. For example, the shell 120 may include two hemispheres that are assembled together after the component 130 is placed inside the cavity formed by the hemispheres. In this variation, the shell 120 may be assembled using fasteners, chemically bonded together using adhesive, and/or welded together. However, any other suitable type of construction for the shell 120 and the components 130 inside the shell 120 may be used.

The surface of the shell 120 may be substantially continuous to contain the component 130 within the volume inside the shell 120. Alternatively, the surface of the shell 120 may include an opening that allows for limited access to the component 130. For example, the opening may allow for wires to pass through the shell 120 to allow for a second component in the animal interaction device 110 to be electrically coupled to the component 130 inside the shell 120. The wires may also allow for data transfer from a data port external to the shell 120 or any other type of communication. In the variation where the component 130 is a battery, the wires may allow for power transfer from a charging port external to the shell 120. The opening may alternatively be used for wireless communication. For example, in the variation where the shell 120 is made of metal, the component 130 may include an antenna and the opening allows for wireless communication with an external device. In another example, the component 130 may include a light transmitter such as an infrared transmitter and the opening allows for line of sight for communication. The opening may also be used for a mechanical connection between the component 130 and an external component. For example, as shown in FIG. 5, the component 130 may be a motor and the opening allows the axle of the motor to engage with the wheel of the car. However, any other suitable arrangement of the shell 120 may be used.

The detection device 140 of the preferred embodiment functions to detect a change in the shell 120. A change in the shell 120 may be the result of the animal playing or tampering with the animal interaction device 110. For example, the animal may bite into or gnaw on the interaction device 110 too hard and cause the shell 110 to puncture and/or tear. The shell 120 may also be worn down by excessive use of the animal interaction device 110. The change in the shell 120 is most commonly a tear or a puncture in the shell 120 but may alternatively be the shell 120 becoming deformed, too thin, and/or weak structurally. The detection device 140 may function to detect when a change in the shell 120 reaches a change threshold. For example, the detection device 140 detects no change until the shell 120 reaches a threshold deformation level or when a full puncture is detected. Alternatively, the detection device 140 may function to detect the magnitude of the change in the shell 120. For example, detecting a range of forces applied to the animal interaction device 110. However, the detection device 140 may function to detect any other type of change in the shell 120.

As shown in FIG. 2, a first variation of the detection device 140 is a trigger device that is triggered when a substantial force or deformation is applied to the shell 120. In a first example, the detection device 140 includes a first conductive wire 144 that is coupled to the shell 120 and a second conductive wire 143 that is held at a distance away from the first conductive wire 144. When a substantial force or deformation is applied to the shell 120 as shown by the dotted lines, the first conductive wire 144 is brought into contact with the second conductive wire 143. This contact is detected by the detection device 140 and a change in the shell 120 is determined. The first and second conductive wires 143 and 144 may alternatively be conductive sheets that are formed to the shape of the shell 120 to provide a larger surface area of contact detection. In a second example, the detection device 140 includes a force sensitive material 146 that is coupled to the shell 120. The force sensitive material 146 may be of the type that changes electrical properties when the shape of the material changes. In this example, the force sensitive material 146 preferably deforms with the deformation in the shell 120, resulting in a change in the electrical property of the force sensitive material 146 that is then detected by the detection device 140. The force sensitive material 146 may also be a force gauge type sensor. Alternatively, the force sensitive material 146 may be of the type that changes electrical properties when compressed. In this example, the force sensitive material 146 may be held between the shell 120 and a secondary surface interior to the shell where deformation in the shell 120 results in compression of the force sensitive material 146 that is detected by the detection device 140. In a third example, the detection device 140 may include a contact switch that is coupled to the shell 120 such that a certain level of deformation in the shell 120 will cause the contact switch to trigger and a change in the shell 120 is detected. However, any other suitable type of trigger may be used for the detection device 140 of the first variation.

Figure 3:
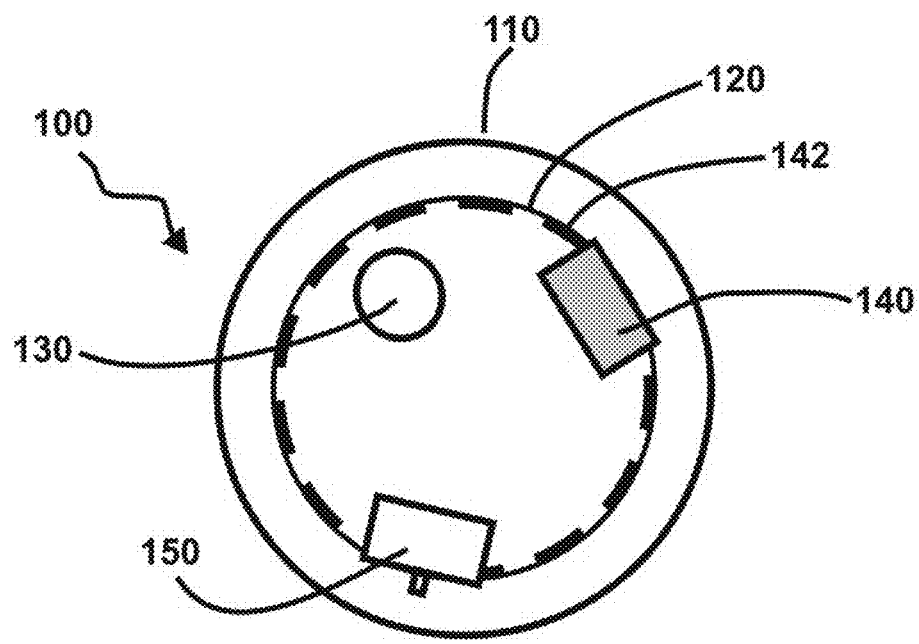
FIG. 3 is a schematic view of the system for a variable animal interaction device with a detection device of a second variation.

As shown in FIG. 3, a second variation of the detection device 140 includes a conductive wire 142 that is coupled to the shell 120. The detection device 140 in this variation functions to detect changes in the conductive wire, for example, the resistance of the wire, the capacitance of the wire, or any other type of change in the wire that may result from a puncture of the shell 120 and a subsequent break or puncture in the conductive wire 142. The conductive wire 142 may alternatively be a conductive sheet that is formed to the shape of shell 120 for increased detection surface area.

Figure 4:
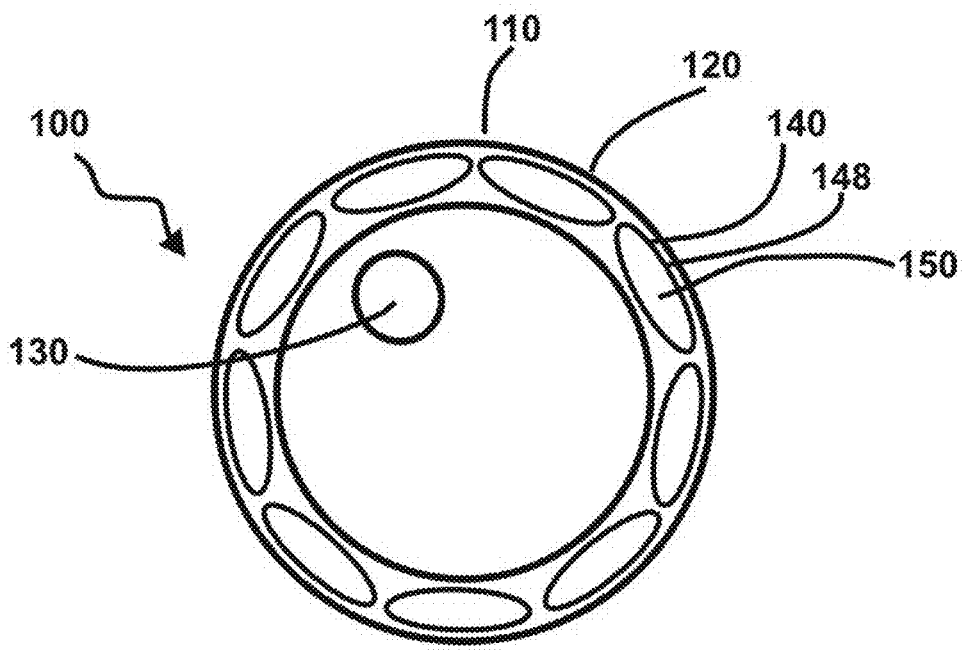
FIG. 4 is a schematic view of the system for a variable animal interaction device with a detection device of a third variation.

As shown in FIG. 4, a third variation of the detection device 140 functions includes a seal 148 that is coupled to the shell 120 where the seal of the detection device 140 breaks when there is a change in the shell 120. In this variation, the detection device 140 preferably functions without the need for electrical components and/or external power. For example, the seal 148 is preferably a substantially thin membrane material that tears when stretched a percentage length beyond its original length. In this example, a certain level of deformation of the shell 120 would cause the seal 148 to tear. However, the detection device 140 may alternatively break the seal 148 with an electrical spark or any other suitable type of mechanism. The seal 148 of this variation preferably functions to contain at least a portion of the deterrent device 150 such that the portion of the deterrent device 150 is released when the seal 148 is broken.

A fourth variation of the detection device 140 includes a sensor that detects a change in the contents of the volume inside the shell 120. For example, the detection device 140 may include a light sensor that detects a change in the amount of light inside the volume to detect a change in the shell 120. In particular, if the shell 120 is punctured and/or torn by the animal, then there may be an increase in the amount of light inside the shell 120. The sensor may also be a proximity sensor that detects the presence of something unexpected (such as the animal's tooth or tongue) inside the volume or an acoustic sensor that detects variation in sound within the volume. The sensor may alternatively detect the presence of an unexpected fluid inside the volume. For example, the presence of water may indicate that animal saliva has penetrated the shell 120, indicating a change in the shell 120. In this variation, the shell 120 may be substantially hermetically sealed at a pressure different from ambient temperature and/or with a gas other than air such that when the shell 120 is punctured and/or torn, a change in pressure and/or a change in the gas content within the volume of shell 120 is detected as a change in the shell 120. However, any other suitable type of sensor that detects any other suitable change in the volume inside the shell 120 may be used.

The detection device 140 is preferably of a variation as described above but may alternatively be any other suitable type of detection device 140.

The deterrent device 150 of the preferred embodiments functions to change the animal interaction device 110 when a change in the shell 120 is detected such that the animal interaction device 110 is less desirable to the animal and the animal is discouraged from further interaction with the animal interaction device 110. The deterrent device 150 preferably has at least two states: an "off" state where no change is applied to the animal interaction device 110 and an "on" state where change is applied to the animal interaction device 110. The deterrent device 150 is preferably in the "off" state until the detection device 140 detects a change in the shell 120. When a change in the shell 120 is detected, the deterrent device 150 is preferably switched to the "on" state.

The system 100 may include a processor that receives a signal from the detection device 140 and triggers the deterrent device 150 into either the "on" or "off" states. Alternatively, such as described in the third variation of the detection device 140 as described above, the switch between "on" and "off" states may be a mechanical switch, in particular, when the seal 148 is broken, the deterrent device 150 is automatically switched to the "on" state and the contents of the seal 148 are released. However, any other management of the deterrent device 150 may be used.

The deterrent device 150 may change the animal interaction device 110 in a variety of ways. In a first variation, the deterrent device 150 can switch off the electronics of the animal interaction device 110. For example, in the variation of the animal interaction device 110 as shown in FIG. 6, the video display device may be switched off. Because the animal interaction device 110 is no longer on, the device 110 becomes less interesting to the animal and the animal may no longer interact with the device 110. In a second variation, the deterrent device 150 may change the movement of the animal interaction device 110 into a movement that is unpleasant to the animal. For example, the deterrent device 150 may include a vibration motor that starts to vibrate the animal interaction device 110 at a frequency that is unpleasant for the animal. In a third variation, the deterrent device 150 may change the sound emitted by the animal interaction device 110 to one that is unpleasant to the animal, such as a loud ultrasonic frequency. In a fourth variation, the deterrent device 150 may change the smell of the animal interaction device 110 to one that is unpleasant to the animal. For example, as shown in FIG. 3, the deterrent device 150 may include a nozzle 152 where a strongly scented fluid may be sprayed out. In this example, the deterrent device 150 may include a pressurized capsule of a scented fluid such as citronella that is released when a change in the shell 120 is detected. In a fifth variation, the deterrent device 150 may change the taste of the animal interaction device 110 to one that is unpleasant to the animal. As shown in FIG. 4, the deterrent device 150 includes a fluid that is encapsulated in the seal 148 of the detection device 140. As described above, the seal 148 is designed to break when a certain magnitude of force or deformation is acted on the shell 120. When the seal 148 breaks, the fluid of the deterrent device 150 is released to the surface of the animal interaction device 110. The fluid is preferably of a bad tasting fluid such as the common Grannick's Bitter Apple fluid that is generally used to spray on objects to deter animals from chewing on the object. The deterrent device 150 is preferably one of these variations as described above but may alternatively be any other suitable type that changes the animal interaction device 110 to become less appealing to the animal.

The system 100 may also include a sensor such as a proximity and/or an accelerometer that detects if the animal approaches or reengages with the animal interaction device 110 after a change in the shell 120 has been detected. When further interaction is detected, the system 100 may trigger the deterrent device 150 to repeat the deterrent process and/or to increase the level of change onto the animal interaction device 110. For example, additional taste, sound, and/or smell deterrents may be deployed.

The system 100 may also include an indicator that indicates to a user that a change in the shell 120 was detected. This allows the user to be informed that the interaction device 110 should be removed from the reach of the animal and/or replaced. The indicator may be an LED on the animal interaction 110 device itself, an audible beep, and/or a message on a remote device such as a computer or mobile device. However, any other suitable indicator may be used.

As a person skilled in the art will recognize from the previous detailed description and from the figures and claims, modifications and changes can be made to the preferred embodiments of the invention without departing from the scope of this invention defined in the following claims.

We claim:

1. A system for a variable animal interaction device comprising:
    an animal interaction device;
    a shell coupled to the animal interaction device;
    a component that is substantially encapsulated within the shell, wherein the shell is a barrier between the animal and the component;
    a detection device that detects a change in the shell;
    a deterrent device that has at least an on and an off state wherein the on state substantially changes the animal interaction device to substantially deter further interaction between the animal and the animal interaction device;
    wherein the deterrent device is actuated into the on state when the detection device detects a change in the shell.

2. The system of claim 1, wherein the animal interaction device is selected from the group consisting of a ball, a squeak toy, a video output device, a sound output device, a food dispensing device, and a remotely controlled device.

3. The system of claim 1, wherein the component is an electrical component.

4. The system of claim 1, wherein the shell is substantially hermetically sealed and wherein the detection device detects a change in pressure within the shell to detect a change in the shell.

5. The system of claim 1, wherein the detection device detects a change in the contents of the volume inside the shell.

6. The system of claim 5, wherein the shell contains a gas other than ambient air and the detection device detects the presence of ambient air.

7. The system of claim 5, wherein the detection device detects the presence of a liquid.

8. The system of claim 1, wherein the detection device includes a conductive wire that is coupled to the shell, wherein the detection device detects a change in the conductive wire to detect a change in the shell.

9. The system of claim 1, wherein the detection device includes a force gauge coupled to the shell, wherein the detection device detects a change in force from the force gauge to detect change in the shell.

10. The system of claim 1, wherein the detection device includes a trigger that is coupled to the shell, wherein the detection device detects an actuation of the trigger to detect change in the shell.

11. The system of claim 1, wherein the detection device includes a sensor that is selected from the group consisting of a proximity sensor, acoustic sensor, and a light sensor, wherein the detection device detects change in sensor measurements to detect a change in the shell.

12. The system of claim 1, wherein the deterrent device is a fluid that is encapsulated and coupled to the shell in the off state and wherein the fluid is released in the on state.

13. The system of claim 12, wherein the detection device includes a membrane that encapsulates the fluid of the deterrent device in the off state and wherein the membrane of the detection device is ruptured in the on state by a change in the shell.

14. The system of claim 1, wherein the deterrent device is a vibration device that causes the animal interaction device to vibrate.

15. The system of claim 1, wherein the deterrent releases a taste that changes the taste of the animal interaction device.

16. The system of claim 1, wherein the animal interaction device has a scent and the deterrent device releases a second scent that changes the scent of the animal interaction device.

17. The system of claim 1, wherein the deterrent device releases a sound that substantially deters further interaction between the animal and the animal interaction device.

18. The system of claim 1, further comprising an indicator that indicates that a change in the shell was detected to a user.

19. A method for responding to interaction with an animal comprising the steps of:
    providing an animal interaction device to an animal;
    providing a shell coupled to the animal interaction device that provides a barrier between the animal and the volume inside the shell;
    substantially encapsulating a component within the shell;
    detecting a change in the state of the shell;
    changing the animal interaction device when a change in the state of the shell is detected;
    wherein the change in the interaction device substantially deters further interaction between the animal and the animal interaction device.

20. The method of claim 19, wherein the step of detecting a change in the state of the shell includes a step selected from the group consisting of detecting an irregularity of the shell, detecting a tear in the shell, detecting an amount of force exerted on the shell, and detecting an ingress of foreign material into the volume within the shell.

21. The method of claim 19, wherein the step of changing the animal interaction device when a change in the state of the shell is detected includes a step selected from the group consisting of changing a taste of the animal interaction device, changing a smell of the animal interaction device, and changing a sound emitted by the animal interaction device.

22. The method of claim 19, further comprising the step of indicating to a user that a change in the shell was detected.

23. The method of claim 19, wherein the step of detecting a change in the state of the shell includes detecting a magnitude of the change in the state of the shell.

* * * * *